E. D. VOTAW.
CHANGE MAKING AND REGISTERING MACHINE.
APPLICATION FILED MAY 27, 1920.
1,429,307. Patented Sept. 19, 1922.
6 SHEETS—SHEET 1.
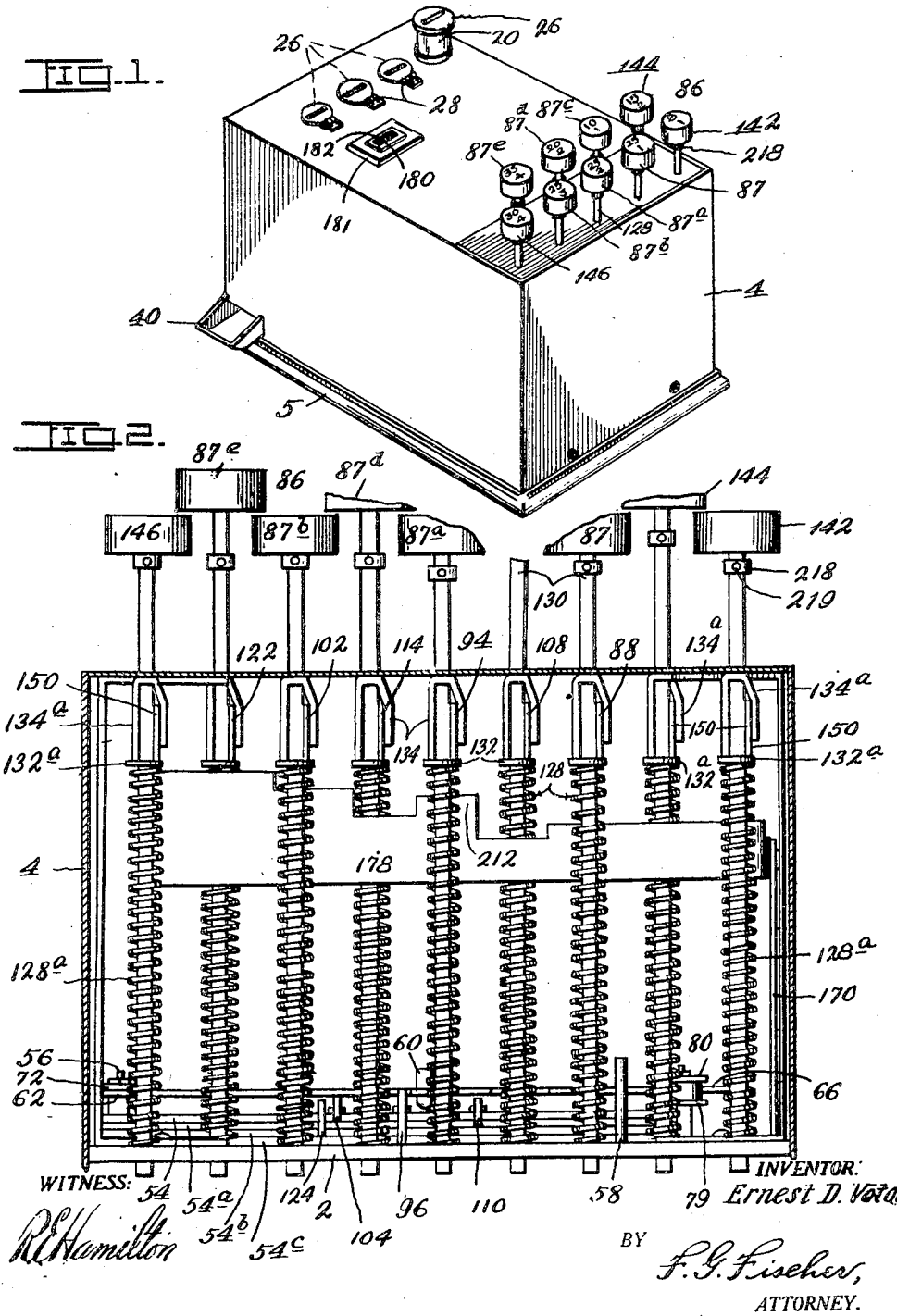

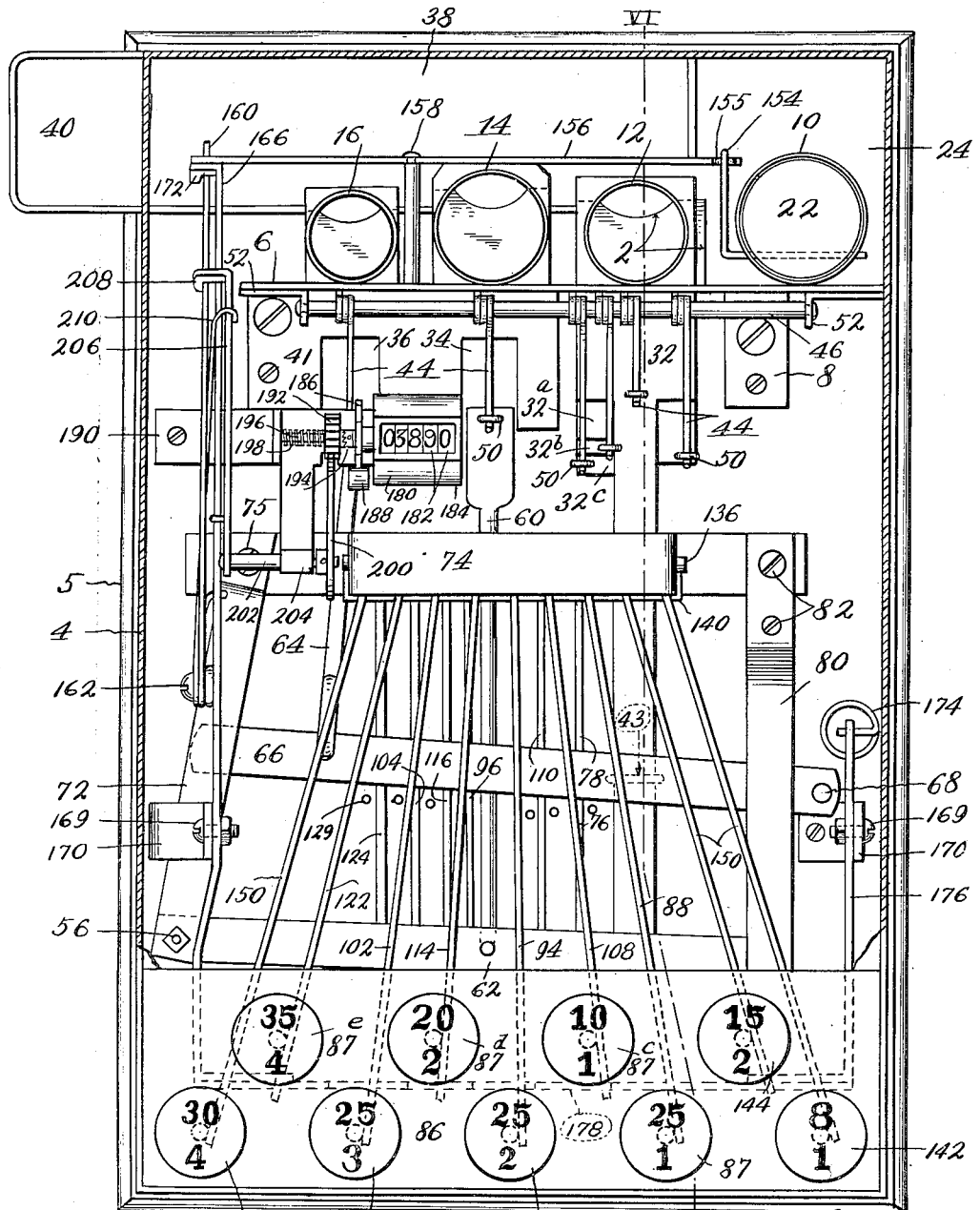

E. D. VOTAW.
CHANGE MAKING AND REGISTERING MACHINE.
APPLICATION FILED MAY 27, 1920.

1,429,307.

Patented Sept. 19, 1922.
6 SHEETS—SHEET 3.

WITNESS:
R. E. Hamilton

INVENTOR:
Ernest D. Votaw,
BY
F. G. Fischer,
ATTORNEY.

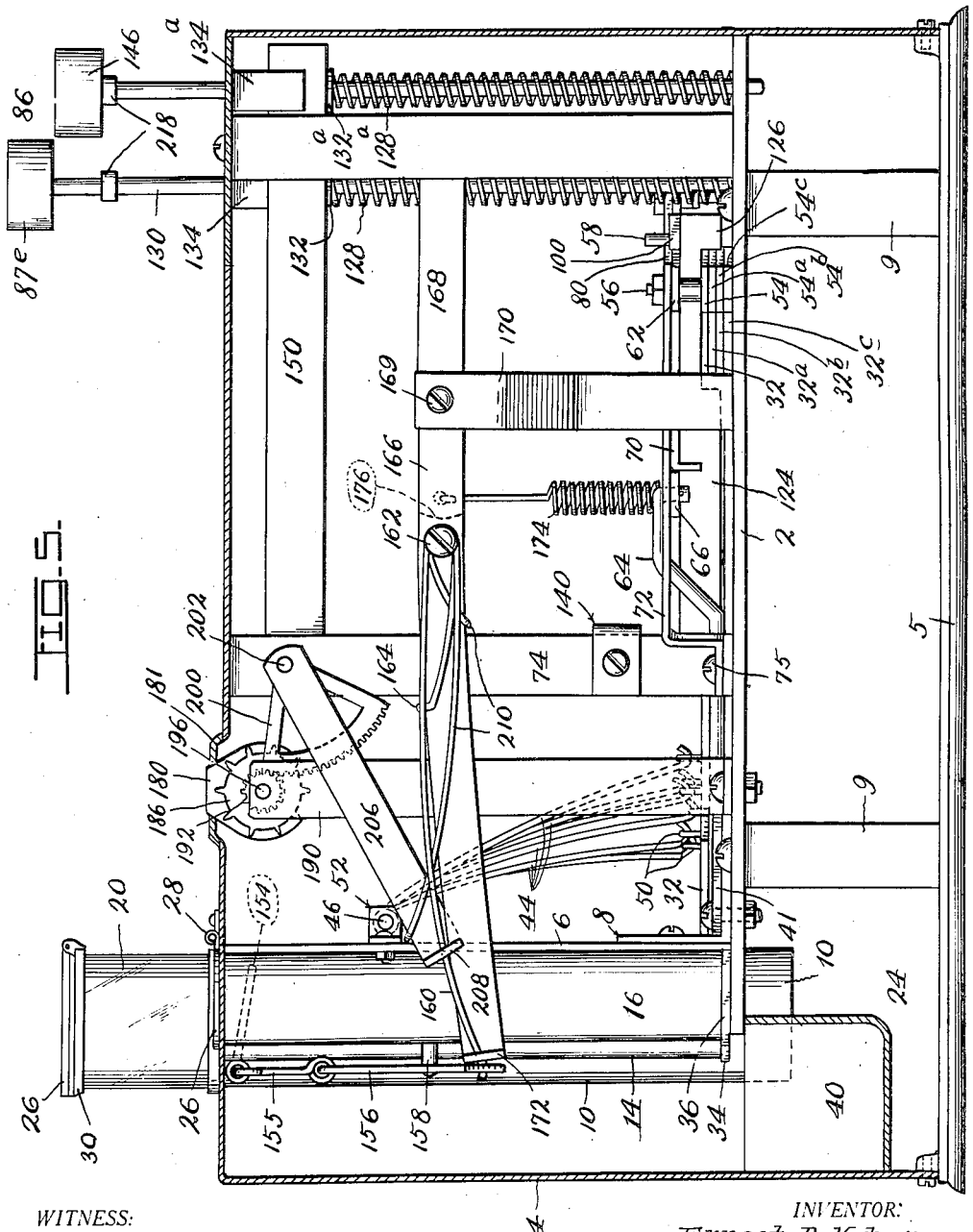

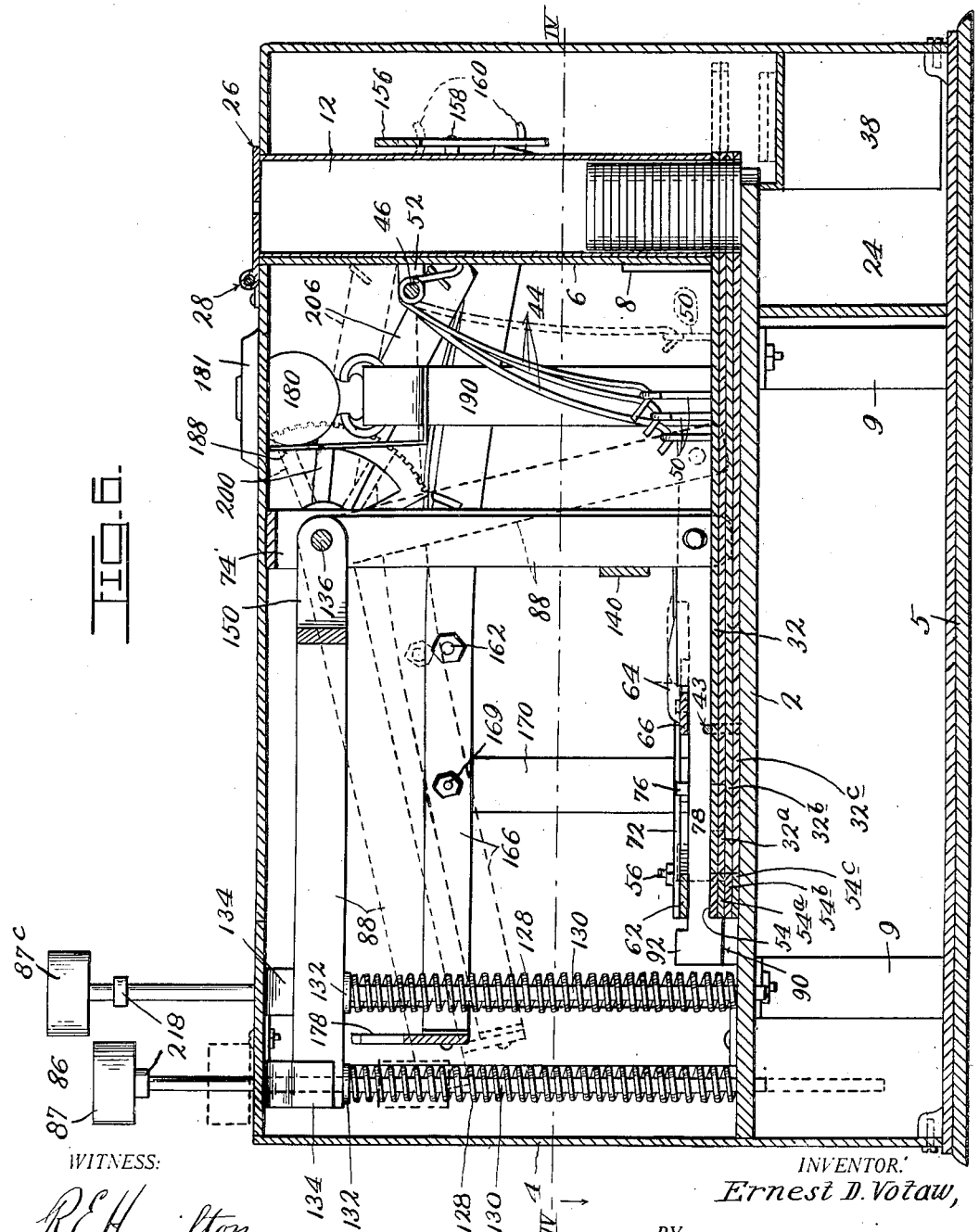

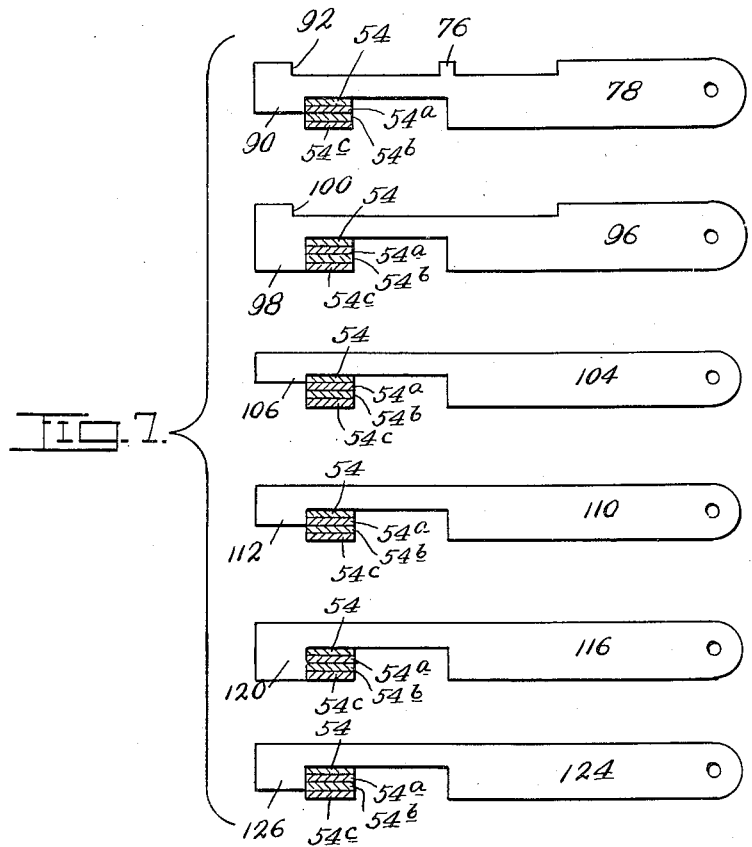
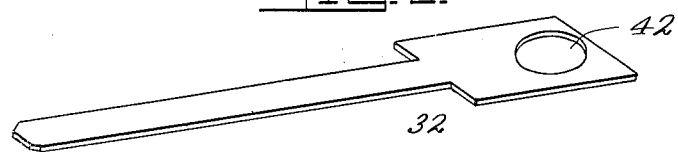

Patented Sept. 19, 1922.

1,429,307

UNITED STATES PATENT OFFICE.

ERNEST D. VOTAW, OF KANSAS CITY, MISSOURI.

CHANGE-MAKING AND REGISTERING MACHINE.

Application filed May 27, 1920. Serial No. 384,764.

*To all whom it may concern:*

Be it known that I, ERNEST D. VOTAW, a citizen of the United States, residing at Kansas City, in the county of Jackson and State of Missouri, have invented certain new and useful Improvements in Change-Making and Registering Machines, of which the following is a specification.

My invention relates to change making and registering machines and has particular reference to means whereby a cashier may by simple and easily operated mechanism deliver to a purchaser the necessary change when a purchase is made and a sum of money in excess of the purchase price is tendered.

The invention provides in a single organized machine means for delivering the proper amount of money in pennies, nickels, dimes, etc., to the customer from the amount tendered the cashier; a register mechanism for registering the amount of the sale or the number of the sale made; a retaining device for retaining in plain view of the cashier the amount deposited in the machine until released and dropped into the receiving compartment; a system of keys so numbered as to indicate the one to be depressed to deliver the proper amount of change; a plurality of magazines of various sizes to hold pennies, nickels, dimes, etc.; and a plurality of coin ejectors and levers arranged in conjunction with the above-mentioned keys for delivering the change.

While the machine in the present instance is designed especially for collecting street car fares where the fare is eight cents the essential and characteristic features of the machine may be modified to meet different requirements.

In order that the invention may be fully understood, reference will now be had to the accompanying drawings, in which:

Fig. 1 is a perspective view of the machine.

Fig. 2 is an end elevation of the machine with some of the parts removed and the case in section.

Fig. 3 is a plan view with the case partly in section.

Fig. 5 is a side elevation with the case in section.

Fig. 6 is a vertical longitudinal section on line VI—VI of Fig. 3.

Fig. 7 shows a group of draw bars and associated elements.

Fig. 8 is a detail perspective view of one of the coin ejectors employed in carrying out the invention.

Figure 4:
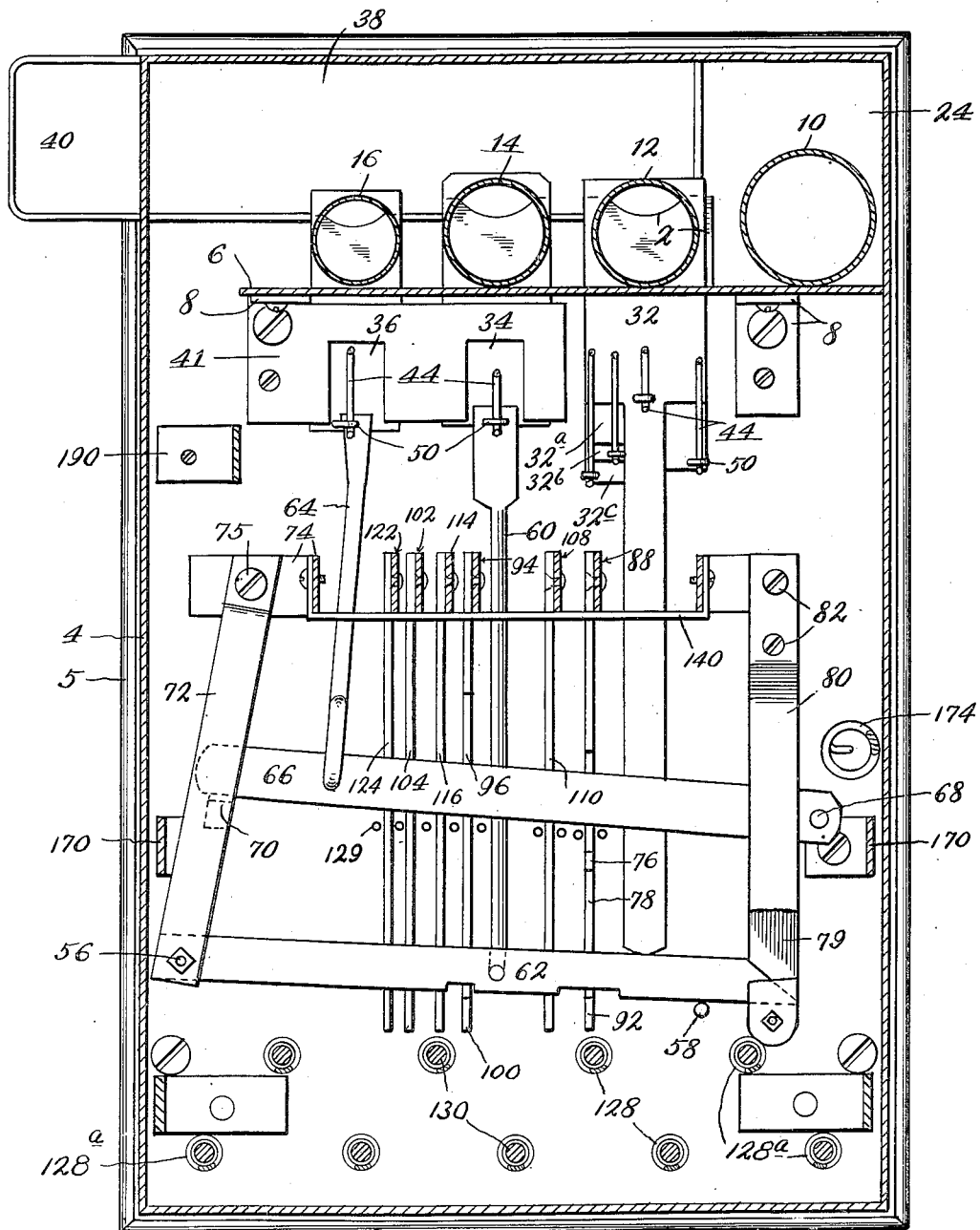
Fig. 4 is a horizontal section on the plane of line IV—IV of Fig. 6.

In carrying out the invention, I employ a base plate 2, carrying the major portion of the mechanism enclosed in a suitable case 4. Said base plate 2 is spaced above the bottom 5 of the case 4 on brackets 9 and provided at its rear portion with a vertically-disposed plate 6 firmly secured in position by brackets 8. The vertically-disposed plate 6 is provided at its rear side with a coin tube 10 and any desired number of coin magazines, three being shown in the present instance and numbered respectively 12, 14 and 16.

The coin magazines are of such diameters as to receive coins of different denominations, and the coins in each magazine are piled upon each other and fit loosely within the respective magazines in order to feed freely through the bottom thereof. In the present instance the tube 10 in which the passengers deposit the fares is of such diameter as to receive coins as large as a quarter. The magazine 12 is of such diameter as to receive one cent coins; the magazine 14, five cent coins; and the magazine 16 ten cent coins. The lowermost coins in the magazines 12, 14 and 16 rest upon the base plate 2.

The upper portion of the tube 10 is equipped with a glass or other transparent tube 20, so that legal or bogus coins placed therein can be readily seen by the conductor as they rest upon a valve 22, which on being opened as will hereinafter appear, allows the coins to fall through the tube 10 into a compartment 24 in the adjacent corner of the case 4, which may have a locked door, so that a person with the proper key may gain access to the coins. The upper ends of the glass tube 20 and the magazines 12, 14 and 16 are equipped with slotted caps 26 through which the coins are inserted. All of the caps 26, excepting the one on top of the tube 20 are secured by hinges 28 to the top of the case 4, so that they may be swung upwardly out of the way and allow a pencil or other instrument to be inserted should the coins become clogged and fail to feed freely from the bottom of the magazines. The slotted cap 26 on the glass tube 20 is hinged to an annulus 30, secured to the top of said glass tube 20.

The coins are fed from the bottom of the magazines 12, 14 and 16 through the intermediacy of coin ejectors 32, 34 and 36, respectively, which discharge the coins into a chute 38 arranged transversely within the rear portion of the case 4 and leading to a cup 40 at the outside of the case, as disclosed more clearly on Figs. 1, 3 and 4.

In some instances it is desirable to simultaneously eject two or more coins from one magazine, so in addition to providing the magazine 12 with the ejector 32, I provide it with ejectors 32$^a$, 32$^b$ and 32$^c$, arranged one beneath the other in the order mentioned. The ejectors 34 and 36 are slidably held in position upon the base plate 2 by the lower ends of the magazines 14 and 16, respectively, and a guide plate 41 secured to said base plate 2, while the ejectors 32 to 32$^c$, inclusive, are slidably held in place by the lower end of the magazine 12 and a U-bolt 43, which latter is secured to the base plate 2.

Each coin ejector has a circular aperture 42 of the same diameter as the bore of the magazine with which the ejector is associated, and each ejector is normally held in a retracted position with its aperture 42 in coincidence with the magazine, by means of a spring 44. Each spring 44 is coiled at its upper portion around a rod 46 and fixed at one end to the vertical plate 6 and at its opposite end to an eye 50, fixed to the associated ejector. The rod 46 is secured to the vertical plate 6 by means of brackets 52.

The ejectors 32, 32$^a$, 32$^b$ and 32$^c$ have superimposed extensions projecting toward the forward portion of the base plate 2 and abutting superimposed levers 54, 54$^a$, 54$^b$ and 54$^c$, respectively, extending across the base plate 2 and mounted upon a pivot 56. Normally the levers 54 to 54$^c$, respectively, are held against a stop 58 through the intermediacy of the pressure exerted by the springs 44. The pivot 56 and the stop 58 are fixed at their lower ends to the base plate 2.

The ejector 34 is advanced by a connecting bar 60 pivoted at one end to the eye 50 associated with said ejector 34 and pivoted at its opposite end to a lever 62 arranged above the lever 54 and mounted at one end upon a pivot 56. The free end of the lever 62 is normally held against the stop 58 through the intermediacy of the pressure exerted by the associated spring 44.

The coin ejector 36 is advanced by a connecting bar 64 pivoted at one end to the associated eye 50 and at its opposite end to a lever 66 extending across the base plate 2 and mounted at one end upon a pivot 68 projecting upwardly from said base plate 2. The free end of the lever 66 is normally held, through the intermediacy of the pressure of the associated spring 44, against a stop 70 depending from a stationary guide bar 72, secured at one end to the pivot 56 and at its opposite end to one of the lower ends of a yoke 74, by a screw 75. The guide bar 72 also prevents the lever 66 from springing upwardly out of the path of a projection 76 on top of a draw bar 78, while the free ends of the levers 54 to 54$^c$, inclusive, are prevented from springing upwardly by a guide bar 79 (Figs. 2 and 4) secured at its ends to the base plate 2 by a superimposed guide bar 80 and screws 82. The guide bar 80 is spaced the major portion of its length above the guide bar 79 and prevents the free end of the lever 62 from springing upwardly out of the path of certain shoulders hereinafter described.

The levers 54, 54$^a$, 54$^b$, 54$^c$, 62 and 66, are actuated from a key board 86 through a system of drawbars and levers as will now be described. Assuming that the fare is eight cents and a passenger deposits a quarter into the tube 20 and one fare is to be deducted, the conductor depresses the key 87, which results in delivering the change of seventeen cents in the form of two pennies, one five cent piece and one ten cent piece, as follows: As the key 87 moves downwardly it rocks a bell-crank 88, pivotally connected at its lower end to the drawbar 78, (Figs. 6 and 7) which is provided at its free end with a depending shoulder 90 and an upwardly projecting shoulder 92. As the drawbar 78 advances, the shoulder 90 engages and advances the levers 54 and 54$^a$ which in turn advance the ejectors 32 and 32$^a$, causing them to deliver two pennies into the chute 38, while the shoulder 92 advances the lever 62, which in turn advances the connecting bar 60 and the ejector 34, which discharges a five cent coin into the chute 38, and the shoulder 76 advances the lever 66 and the connecting bar 64, causing the ejector 36 to deliver a dime into the chute 38.

If two fares are to be deducted from the quarter, nine cents change is delivered to the passenger by depressing the key 87$^a$, which rocks a bell-crank 94 (Figs. 3 and 4) pivotally connected at its lower end to a drawbar 96 (Fig. 7) provided at its free end with a depending shoulder 98 and an upwardly projecting shoulder 100. As the drawbar 96 advances, its shoulder 98 engages the levers 54 to 54$^c$ inclusive, causing the same to advance the ejectors 32 to 32$^c$, inclusive, and effect the delivery of four pennies into the chute 38. Advancement of the drawbar 96 also causes the shoulder 100 to actuate the lever 62, which advances the connecting rod 60 and the ejector 34, causing the delivery of a five cent coin or nine cents in all into the chute 38.

If three fares are to be deducted from the quarter, one cent in change is delivered on the depression of the key 87$^b$, which actuates a bell-crank 102 (Figs. 3 and 4) pivotally connected at its lower end to a draw bar 104 (Fig. 7) provided at its free end with a depending shoulder 106, which engages the lever 54 and advances the same with the ejector 32, causing the delivery of one penny into the chute 38.

If a ten cent piece is dropped into the tube 20, two cents in change is delivered by depressing the key 87$^c$, which actuates a bell-crank 108 pivotally connected at its lower end to a draw bar 110 provided at its free end with a depending shoulder 112, which engages and advances the levers 54 and 54$^a$ with the ejectors 32 and 32$^a$, which deliver two pennies into the chute 38.

If two ten cent pieces are dropped into the tube 20 and two fares are to be deducted, the key 87$^d$ is depressed which actuates a bell-crank 114 pivotally connected at its lower end to a draw bar 116 provided at its free end with a depending shoulder 120, which engages and advances the levers 54 to 54$^c$, inclusive, causing them to advance the ejectors 32 to 32$^c$, inclusive, and deliver four pennies change into the chute 38.

If thirtyfive cents is dropped into the tube 20, from which four fares are to be deducted, the key 87$^e$ is depressed and actuates a bell-crank 122 pivoted at its lower end to a draw bar 124 provided at its free end with a depending shoulder 126, which engages and advances the levers 54 to 54$^b$, inclusive, which in turn advance the ejectors 32 to 32$^b$, inclusive, and cause them to deliver three pennies change into the chute 38.

When the respective keys are released they are restored to normal position with the associated bell-cranks and draw bars by coil springs 128, while the respective ejectors and their actuating levers 62, 66 and 54 to 54$^c$, inclusive, are restored to normal position by the springs 44, as hereinbefore described. Guide pins 129 prevent lateral displacement of the draw bars.

Each coil spring 128 loosely embraces its respective key stem 130 and is interposed between the base plate 2 and a washer 132 underlying the upper end of the associated bell-crank and a U-shaped member 134, (Fig. 2) fixed to the stem 130 and engaging the end of the bell-crank to hold the same in engagement with the washer 132. Each key stem 130 is reciprocably mounted in the base plate 2 and the top wall of the case 4.

The bell-cranks are mounted upon a fulcrum 136, (Figs. 3 and 6) mounted in the upper portion of the yoke 74. A stop 140 is secured to the lower portion of the legs of the yoke 74 to line up the bell-cranks as they are restored to normal position.

In addition to the keys above specified, the key board embodies keys 142, 144 and 146, the stems of which like the associated key stems are reciprocably mounted in the base plate 2 and the top of the frame 4. Said keys 142 to 146, inclusive, are normally held in raised position by coil springs 128$^a$ and washers 132$^a$, which latter are fixed to the key stems. The stems of the keys 142 to 146, inclusive, are provided at their upper portion with fixed U-shaped members 134$^a$, which engage levers 150 and retain them in position upon the associated washer 132$^a$. The levers 150 are merely straight bars pivotally mounted at their forward ends upon the fulcrum 136.

When one fare of eight cents is deposited in the tube 20 the key 142 is depressed but of course no change is delivered to the chute 38. The keys 144 and 146 are provided only in case it is decided to reduce the cost of two fares to fifteen cents and four fares to thirty cents. When either of the keys 144—146 are operated no change is delivered. The top surfaces of all the keys constituting the key board are inscribed with numerals as shown on Figs. 1 and 3, so that the operator may readily determine which key to depress. Each time any key is depressed the valve 22 supporting the fare or fares is opened by the following described mechanism. Referring more particularly to Figs. 3 and 5, it will be noted that the valve 22 is mounted upon a crank 154, pivotally mounted in the upper portion of the tube 10 and connected at its free end to one end of a lever 156 mounted upon a fulcrum 158, projecting from the vertical plate 6. The opposite end of the lever 156 is connected to one end of a spring 160 coiled about a screw or other fastening device 162 and formed into a hook 164 at its opposite end which engages the long arm 166 of a U-shaped lever 168 carrying the fastening device 162 and fulcrumed upon standards 170 extending upwardly from the base plate 2. The forward end of the long arm 166 is formed into a hook 172, which engages over the forward end of the spring 160 which passes through an eye in the adjacent end of the lever 156.

A coil spring 174 (Fig. 5) secured to the base plate 2 and the opposite arm 176 of the U-shaped lever 168 normally holds the forward end of the long arm 166 in lowered position, and through the intermediacy of the spring 160 and the lever 158, holds the valve 22 in closed position until the rear transverse portion 178 (Fig. 3) of said lever 168 is forced downwardly by the depression of a key. When this occurs the forward end of the lever arm 166 swings upwardly carrying the spring 160 therewith, and causes it to open the valve 122 through the intermediacy of the lever 156 and the crank 154. After the valve 22 is fully opened, the crank 154 checks further movement of the lever 156, but the long arm 166 of the lever 168 may continue to move upwardly to actuate a register 180 until the hook-shaped terminal 172 passes out of engagement with the spring 160.

The register 180 is provided to count the fares and may be of any well known type embodying a plurality of disks containing peripheral numerals 0 to 9, inclusive, which successively appear at an opening 182 in the upper portion of the case 184 of said register 180. The upper portion of the register 184 projects through an apertured plate 181 fixed to the top of the case 4. The shaft of the register 180 is provided with an escape-wheel 186, which is engaged by a resilient detent 188 fixed to a bracket 190 (Fig. 5) extending upwardly from the base 2 and carrying the register 180. The escape-wheel 186 rotates in one direction only to actuate the numeral bearing disks of the register 180, and is driven by a pinion 192 through the intermediacy of a ratchet clutch 194 (Fig. 3), one member of which is fixed to the escape wheel 186 and the other to the pinion 192. The pinion 192 is freely mounted upon a stub shaft 196 and yieldably-forced toward the escape wheel 186 by a coil spring 198 to normally hold the two members of the clutch 194 in engagement so that the disk or disks of the register 180 will be rotated in a direction to count each time a key is depressed, but when the key is released and through the intervening mechanism rotates the pinion 192 backwardly the spring 198 allows the clutch member on said pinion 192 to slide past the clutch member on the escape wheel 186, which is held stationary by the detent 188 and prevents backward rotation of the register disks.

As disclosed more clearly on Fig. 5, the pinion 192 is actuated by a segmental gear 200 fixed upon one end of a shaft 202 journaled in a bearing 204 (Fig. 3) at the upper portion of the bracket 190. The opposite end of the shaft 202 is provided with a fixedly-mounted crank 206 having a hook 208 at its free terminal to engage over the spring 160 and the arm 166, said crank 206 being normally held in depressed position by the forward end of a spring 210, coiled about the screw 162 and having its other end engaging the underside of the arm 166.

As disclosed more clearly on Fig. 2, the transverse portion 178 of the U-shaped lever 168 has an irregular-shaped upper surface which coacts with the keys and associated mechanism to cause the register 180 to properly record the fares. For instance, the upper surface of said transverse portion 178 is cut away beneath the levers 88 and 150 of the keys 87 and 142, respectively, so that said levers when depressed will move downwardly a considerable portion of their stroke before engaging and depressing said transverse portion 178, and hence the latter through the intervening mechanism will cause the register 180 to indicate but one fare. That part of the transverse portion 178 of the lever immediately beneath the lever 94 of the key 87$^a$ has an upward extension 212, so that said key 87$^a$ will move the lever 168 through a sufficient arc to cause the register to record two fares, while the key 87$^b$ moves said lever 168 through a greater arc and causes the register 180 to indicate three fares, and so on throughout the key board.

In order to prevent the different keys from moving downwardly too far and causing the register 180 to count incorrectly the key stems are provided with collars 218 adjustably held in place by set screw 219 and adapted to contact with the top of the case 4 and thus limit said downward movement.

While I have shown magazines for holding only pennies, nickels and dimes, it is obvious that additional magazines may be provided to hold coins of greater denominations. I also reserve the right to make such other changes in the construction, combination and arrangement of parts as properly fall within the spirit and scope of the invention.

Having thus described my invention, what I claim and desire to secure by Letters Patent, is:

1. In a machine of the character described, a plurality of coin magazines, coin ejectors associated with the respective magazines, a plurality of levers a number of which are superimposed and all of which are adapted to advance said ejectors for a working stroke, horizontally-disposed bars arranged within the same plane and having shoulders of different depths for selectively actuating said levers, and key-controlled means for actuating said bars.

2. In a machine of the character described, a plurality of coin magazines, coin ejectors associated with the respective magazines, horizontally disposed levers a number of which are superimposed and all of which are adapted to advance said ejectors for a working stroke, longitudinally movable members for selectively actuating said levers, and key-operated levers for actuating said members.

3. In a machine of the character described, a plurality of coin magazines, coin ejectors associated with the respective magazines, a plurality of levers to advance said ejectors for a working stroke, longitudinally movable members having shoulders for selectively actuating said levers, bell-cranks for actuating said members, and means for actuating said bell-cranks.

4. In a machine of the character described, a plurality of coin magazines, independent coin ejectors associated with the respective magazines and a number of which are superimposed to simultaneously deliver a plurality of coins from the associated magazine, a plurality of elements to advance said ejectors for a working stroke and a number of which are superimposed and arranged to either independently or to simultaneously actuate the superimposed ejectors, and means for selectively actuating said elements.

5. In a machine of the character described, a plurality of coin magazines, coin ejectors associated with the respective magazines, a plurality of levers to advance said ejectors for a working stroke, horizontally disposed draw bars having shoulders of different lengths for selectively actuating said levers, and key-controlled means for actuating said draw bars.

6. In a machine of the character described, a plurality of coin magazines, coin ejectors associated with the respective magazines and a number of which are superimposed to simultaneously deliver a plurality of coins from the associated magazine, a plurality of elements to advance said ejectors for a working stroke and a number of which are superimposed to simultaneously actuate the superimposed ejectors, bars having shoulders of different depths for selectively actuating said elements, and means for actuating said bars.

7. In a machine of the character described, a coin magazine, a plurality of independent superimposed coin ejectors associated with said magazine, a plurality of superimposed levers to advance said ejectors for a working stroke, and key-operated means for selectively actuating said levers and whereby a number of the latter may be either independently or simultaneously actuated to effect the delivery of a like number of coins from the magazine.

8. In a machine of the character described, a plurality of coin magazines, coin ejectors associated with the respective magazines, a register, toothed gears for actuating said register, a crank to actuate said gears, a lever to actuate said crank and having an irregular surface, and key-operated means for selectively actuating the ejectors and coacting with the irregular surface of the lever to move the same and the register different distances.

In testimony whereof I affix my signature, in the presence of two witnesses.

ERNEST D. VOTAW.

Witnesses:
FRED C. FISCHER,
L. J. FISCHER.